Aug. 14, 1962 R. ABRAMS ETAL Re. 25,224

CONTROL KNOB

Original Filed July 12, 1954

Inventors
Ralph Abrams
Warren H. West
By Roberts, Cushman & Grover
Att'ys

United States Patent Office

Re. 25,224
Reissued Aug. 14, 1962

25,224
CONTROL KNOB

Ralph Abrams, Sharon, Mass., and Warren H. West, Seabrook Beach, N.H., assignors to Cambridge Thermionic Corporation, Cambridge, Mass., a corporation of Massachusetts Original No. 2,861,825, dated Nov. 25, 1958, Ser. No. 442,812, July 12, 1954. Application for reissue May 31, 1960, Ser. No. 33,068
8 Claims. (Cl. 287—52.06)

Matter enclosed in heavy brackets [ ] appears in the original patent but forms no part of this reissue specification; matter printed in italics indicates the additions made by reissue.

The present invention relates to control knobs for attachment to smooth shafts such as are found on electric control panels and similar installations.

Control knobs of known types have defects which affect the ease and exactness of connection with a shaft, their adjustment, and the possibility of dismounting and resecuring the knob to the shaft. Knobs which are attached by means of set screws or the like become easily loosened due to the fact that the grip about the shaft is not uniform, whereas knobs which are attached to shafts with reference to flats, or similar angle-determining provisions, require the shaft to be in a definite position when the knob is put on.

It is an object of the present invention to provide a control knob which securely, uniformly and symmetrically grips the *shaft* [knob], to provide such a knob which can be rotated freely about a shaft prior to attachment and firmly fastened thereto in any index position without disturbing the position of the shaft, and to provide a control knob which can be secured to the shaft with ease and a minimum of effort.

According to the present invention a control knob assembly comprises: a sleeve which is longitudinally split at one end for radial resiliency at that end, which sleeve has a smooth bore throughout its length adapted to accommodate a shaft, and which sleeve has an outside threaded end portion, the remainder of the outside being smooth; a knob body which on one side engages the smooth portion of the sleeve and which has on the other side an axial recess surrounding the threaded end portion of the sleeve, clearing it with an annular space between sleeve and knob body; a nut which is closed on one side where it has tool engaging means, which nut fits the threaded end portion of the sleeve, and which nut is with clearance accommodated by the recess of the knob body when engaging the end portion of the sleeve; and wedging means including tapered surfaces surrounding the split end of the sleeve, whereby tightening of the nut radially compresses the sleeve at this split end to engage the shaft upon relative axial movement of sleeve, nut and wedging means. According to one aspect of the invention, the tapered surfaces are on the knob body or an inset thereof and on the sleeve whereas, in another aspect, these surfaces are on the nut and on the sleeve.

These and other objects and aspects of the invention will appear from the herein presented description of two typical embodiments illustrating its novel characteristics. These refer to drawings in which FIG. 1 is a top view of a knob according to the invention;

Figure 1:
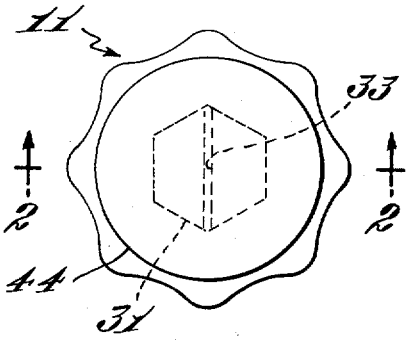
Figure 2:
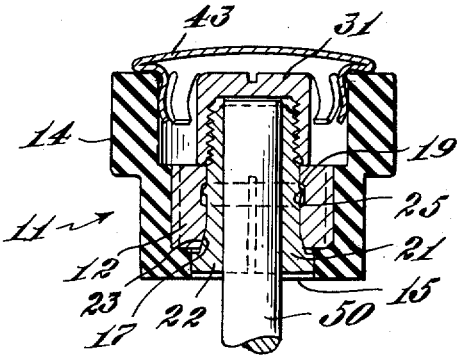
FIG. 2 is a section through the knob assembly with the shaft to which it is attached in elevation, on lines 2—2 of FIG. 1.
Figure 3:
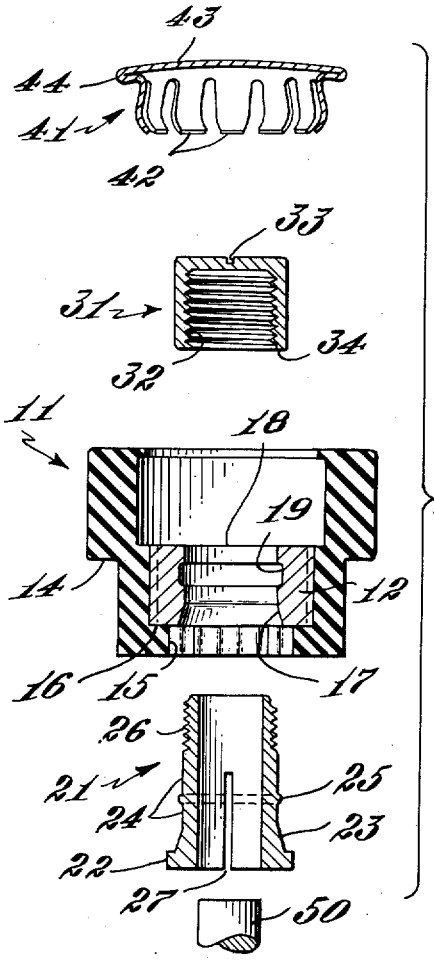
FIG. 3 is an exploded sectional view corresponding to FIG. 2.

The knob assembly shown in FIGS. 1 to 3 has a knob body which consists of a molded portion 11 of suitable plastic material such as a phenolic resin which contains, molded thereinto, a metal inset 12, for example machined from brass stock. The molded portion 11 has a shoulder 14 and opens into an inwardly protruding hexagonal rim 15 whose upper face is flush with the outer face of the inset 12. The inset 12 has next to the above mentioned outer face a tapered portion 17 and between the opposite face 18, and the taper 17, an inner annular recess 19 the width of which is related to a bead of the tapered sleeve. The widened portion of the bore of knob 11, above the face or shoulder 18, forms a space for confining the upper part of a sleeve 21 and a nut 31, now to be described.

The sleeve 21, machined from metal stock such as brass, has a hexagonal head portion 22 which fits the hexagonal opening 15 of the knob body, and a taper portion 23 which fits the taper 17 of the inset 12. The sleeve 21 has further a cylindrical portion 24 with a bead 25, and at the end opposite to the hexagonal head 22 it has a threaded portion 26. The sleeve is slotted as indicated at 27, to a point between the bead 25 and the threaded portion 26, to provide a certain spring action of the taper and bead portions. The bead 25 is considerably narrower than the above described annular recess 19 of the inset 12.

The closed nut 31 has a thread 32 that fits the thread 26 of the sleeve 21, and a slot 33 for tightening by means of a screwdriver. The nut can be hexagonal to permit the use of a socket tool.

The cover cap 41 of metal has spring fingers 42, a smooth outer cover portion 43 and a flange 44. Instead, a cap made of resilient non-conducting material such as rubber or polyethylene can be used, in which case the spring fingers can be eliminated.

As particularly indicated in FIG. 3, this knob is used as follows.

For shipment and handling prior to final assembly, the sleeve 21 is inserted into the knob body 11 by slight pressure, so that the bead 25 comes to lie within the annular recess 19 of the inset 12 thus loosely joining the two parts. Also for purposes of shipment and storage, the nut 31 can be loosely screwed onto the sleeve 21. In this condition, the hexagonal head 22 of sleeve 21 rests loosely within the hexagonal opening 15 of the knob body 11, with the nut only screwed on far enough to hold it on the sleeve but not tightened so as to bring the two taper surfaces 17 and 23 into pressurable contact.

For attaching the knob to a shaft, such as shown at 50 of FIGS. 2 and 3, the sleeve 21 is slipped over the shaft 50, and the nut 31 tightened by means of a socket wrench or screwdriver. The annular face 34 of the nut 31 is thus pressed against the upper face 18 of the inset 12, thereby lifting the sleeve 21, bringing the two tapered surfaces 17 and 23 into contact, compressing the tapered portion of the sleeve 21, and thus pressing the slotted portion of the sleeve against the shaft 50. It will be noted from FIG. 2 that the shaft is securely held over the entire length of the sleeve 21, that the bead 25 is with some clearance contained within the recess 19, and that the hexagonal head 22 of the sleeve 21 is contained within the hexagonal opening 15 of the knob body 11, with some clearance between this head and the inset 12, and with the surface of the hexagonal head 22 well within that opening of the knob body. The nut 31 is then covered with the cap 41 which can be attached in well known manner to the upper part of the knob, with the spring fingers 42 pressurably engaging the cover recess and the flange 44 resting against its outer face, as indicated in FIG. 2. In this manner, the metal assembly within the knob is fully protected and its insulation assured.

Figure 4:
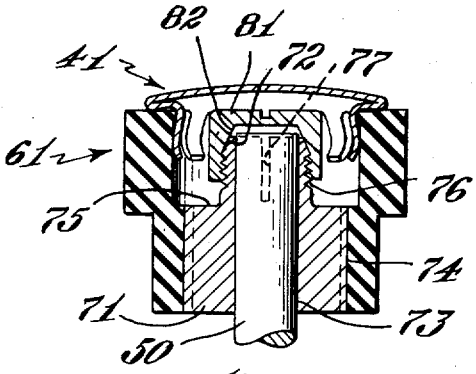
FIG. 4 is a longitudinal section, similar to FIG. 2, of a second embodiment of the invention.
Figure 5:
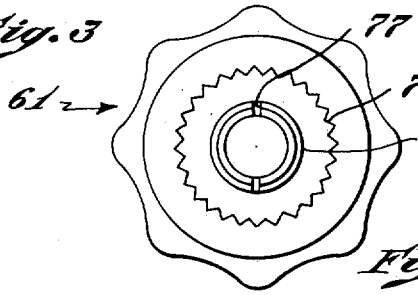
FIG. 5 is a top view of the knob according to FIG. 4, with the cap and nut removed.

A second embodiment of the invention is shown in FIGS. 4 and 5 as follows.

The knob body 61 is generally speaking similar to the above described body 11, with the exception that it contains molded thereinto a sleeve 71 which has a smooth inner bore 73, a knurled outer surface 74 securing the inset to the body 61 upon being molded thereinto, and on a shoulder 75 a threaded portion 76, which is slotted at 77.

The nut 81 is similar to nut 31 of the first described embodiment, but it has an inside taper 82 which fits an edge or taper 72 of the thread portion 76 of the inset 71.

For assembly, the knob with inset 71 and nut 81 loosely attached is slipped over shaft 50 and the nut 81 tightened by means of a socket or screwdriver whereupon the tapers 72 and 82 will contact and then compress the slotted portion of the inset, securing the knob to the shaft. The knob recess can be closed with the cap 41 as described above with reference to FIGS. 1 to 3.

It will be noted that the shaft is in both instances centered and secured over the entire length of the inset and that the knob can be put on the shaft in any desired angular position with the above mentioned advantages of this arrangement. It will be noted that, in the embodiment according to FIGS. 1 to 3, the length of the shaft portion which protrudes beyond a panel or similar element is not particularly critical, since the end portion of the shaft will be secured to the slotted portion of the inset even if the end of the shaft is well within that slotted portion.

It should be understood that the present disclosure is for the purpose of illustration only and that this invention includes all modifications and equivalents which fall within the scope of the appended claims.

We claim:

1. A control knob assembly comprising a sleeve which is longitudinally split at one end for radial resilience at that end, which has a smooth bore throughout its length adapted to accommodate a shaft, which has an outside threaded end portion, next to said threaded portion a smooth portion with an annular bead, and which has at said split end an annular taper next to said smooth portion, and a polygonal head; a knob body which at one side circularly encompasses said smooth portion and said taper of said sleeve and polygonally encompasses said head of said sleeve and has on that side a tapered recess for said taper of said sleeve and an annular groove for but wider than said bead, and which has on the other side an axial recess surrounding said threaded end portion of said sleeve, clearing it with an annular space between sleeve and knob body; and a nut having tool engaging means, which nut fits said threaded end portion of said sleeve and which nut fits with clearance said recess of said knob body, when engaging said end portion; whereby, upon tightening of the nut and consequent axial movement between sleeve and knob body, said split end of said sleeve is radially compressed to engage the shaft.

2. A control knob assembly comprising a sleeve which is longitudinally split at one end for radial resilience at that end, which has a smooth bore throughout its length adapted to accommodate a shaft, an outside threaded end portion opposite to said split end, and a taper and a polygonal head at said split end; a knob body having an axial bore throughout its length which at one side encompasses said taper or said sleeve and has on that side a taper fitting said sleeve taper and a recess for engaging said head, and which has on the other side a widened portion surrounding said threaded end portion of said sleeve, clearing it with an annular space *axially open to the outside* between sleeve and knob body and forming a shoulder *at the inner end of said widened portion of the bore,* and a nut having *on one side* tool engaging means, which nut fits said threaded end portion of said sleeve, *bears, at its end opposite to the tool engaging means, against said shoulder of the knob body,* and fits [with clearance said recess] *within said annular space* of said knob body *with clearance between nut and knob body,* when engaging said end portion and *bearing against* said shoulder, said annular space being [higher than] *at least substantially as high as* said nut; whereby, upon tightening of the nut and consequent axial movement between sleeve and knob body, said split end of the sleeve is radially compressed to engage the shaft, and said annular space containing the nut can be closed with cap.

3. A control knob assembly comprising: a sleeve which is longitudinally split at one end for radial resiliency at that end, which has a smooth bore throughout its length adapted to accommodate a shaft, and which has an outside threaded end portion, the remainder of the outside being smooth; a knob body having an axial bore throughout which on one side engages said smooth portion of said sleeve, [and] which has on the other side an axial recess surrounding said threaded end portion of said sleeve, clearing it with an annular space between sleeve and knob body *and which has a transverse face at the bottom of said axial recess*; a nut having tool engaging means and a thread fitting said threaded end portion of said sleeve *and said nut, oppositely to the tool engaging means, bearing against said transverse face at the bottom of said axial recess of the knob body,* the outer surface of said nut being with radial clearance accommodated by said recess of said knob and [being] *said recess being at least substantially as high as said nut, so that said nut is* substantially confined therein when engaging said end portion of the sleeve *and bearing against said transverse face of the knob body*; and wedging means including tapered surfaces surrounding said split end of said sleeve for radially compressing said sleeve at said split end by tightening said nut; whereby the shaft is engaged upon relative axial movement of sleeve, nut and wedging means and the nut is when tightened protected by the knob body against loosening and accidental disengagement of shaft and knob.

4. A control knob assembly comprising: a sleeve which has an outside threaded end portion and is longitudinally split at that end portion for radial resiliency and which has a smooth bore throughout its length adapted to accommodate a shaft; a knob body which is on one side fastened to the other end portion of said sleeve opposite said split portion and which has on its other side a recess surrounding and substantially extending beyond said threaded end portion of said sleeve, clearing it with an annular space between thread and knob body; and a nut having tool engaging means, which nut fits said threaded end portion of said sleeve is substantially confined in said recess of said knob body, and which nut has an inside taper at the end of said thread for radially compressing said sleeve at said split end upon tightening of the nut; whereby the shaft is engaged upon relative axial movement of nut and split end portion of the sleeve and the nut is when tightened protected by the knob body against loosening and accidental disengagement of shaft and knob.

5. A control knob assembly comprising: a sleeve which is longitudinally split at one end for radial resilience at that end, which has an axial smooth bore adapted to accommodate a shaft, an outside threaded end portion opposite to said split end, and a taper and a polygonal head at said split end; a knob body which at one side encompasses said taper of said sleeve, which has on that side a tapered recess fitting said taper and a recess for engaging said polygonal head, and which has on the other side an axial recess surrounding said threaded end portion of said sleeve, clearing it with an annular space *axially open to the outside* between sleeve and knob body, *and said knob body having a transverse face intermediate said tapered recess and said axial recess*; and a nut having *on one side* tool engaging means, fitting said threaded end portion of said sleeve, [and] being substantially confined in said recess of said knob body when engaging said end portion [and] *of said sleeve, and having on the other side a face for engaging said face of said knob body, such that an outwardly open annular space remains in said axial recess between the knob body and the nut, and said nut* by axial movement between sleeve and knob body radially compressing said split end of said sleeve; whereby the shaft is engaged upon relative axial movement of nut and split end portion of the sleeve and the nut is when tightened protected by the knob body against loosening and accidental disengagement of shaft and knob.

*6. A control knob assembly comprising: a sleeve which is longitudinally split at one end for radial resilience at that end, which has an axial bore adapted to accommodate a shaft and affording a bearing surface for rotation of the sleeve about the shaft to establish a desired angular relation between sleeve and shaft, an outside threaded end portion opposite to said split end, and a taper at said split end; a knob body which at one side encompasses said taper of said sleeve, which has on that side a tapered recess fitting said taper, said sleeve and said knob body having mating locking portions of noncircular sectional shape locking the sleeve and knob body against relative rotation while permitting relative axial sliding thereof, said knob body having on the other side an axial recess surrounding said threaded end portion of said sleeve, clearing it with an annular space axially open to the outside between sleeve and knob body, and said knob body having a transverse face intermediate said tapered recess and said axial recess; and a nut having on one side tool engaging means, fitting said threaded end portion of said sleeve, being substantially wholly confined within said axial recess of said knob body when engaging said end portion of said sleeve, and having on the other side a face for engaging said face of said knob body, such that an outwardly open annular space remains in said axial recess between the knob body and the nut, and said nut by axial movement between sleeve and knob body radially compressing said split end of said sleeve; whereby the shaft is engaged upon relative axial movement of nut and split end portion of the sleeve and the nut is when tightened protected by the knob body against loosening and accidenatl disengagement of shaft and knob.*

*7. A control knob assembly comprising: a sleeve which is longitudinally split at one end for radial resilience at that end, which has an axial bore adapted to accommodate a shaft and affording a bearing surface for rotation of the sleeve about the shaft to establish a desired angular relation between sleeve and shaft, an outside threaded end portion opposite to said split end, and a taper and a polygonal head at said split end; a knob body which at one side encompasses said taper of said sleeve, which has on that side a tapered recess fitting said taper, and a recess for engaging said polygonal head, and which has on the other side an axial recess surrounding said threaded end portion of said sleeve, clearing it with an annular space axially open to the outside between sleeve and knob body, and said knob body having a transverse face intermediate said tapered recess and said axial recess; and a nut having on one side tool engaging means, fitting said threaded end portion of said sleeve, being substantiall wholly confined within said axial recess of said knob bod when engaging said end portion of said sleeve, and hav ing on the other side a face for engaging said face of sai knob body, such that an outwardly open annular spac remains in said axial recess between the knob body an the nut, and said nut by axial movement between sleev and knob body radially compressing said split end o said sleeve; whereby the shaft is engaged upon relativ axial movement of nut and split end portion of the sleev and the nut is when tightened protected by the knob bod against loosening and accidental disengagement of shaf and knob.*

*8. A control knob assembly comprising: a sleeve whic is longitudinally split at one end for radial resilience a that end, which has an axial smooth bore adapted to ac commodate a shaft and affording a bearing surface fo rotation of the sleeve about the shaft to establish a de sired angular relation between sleeve and shaft, an outsid threaded end portion opposite to said split end, and taper at said split end; a knob body which at one sid encompasses said taper of said sleeve, which as on th side a tapered recess fitting said taper, said sleeve an said knob body having mating locking portions of nor circular sectional shape locking the sleeve and knob bod against relative rotation while permitting relative axi sliding thereof, said knob body having on the other si an axial recess surrounding said threaded end portion c said sleeve, clearing it with an annular space axially ope to the outside between sleeve and knob body, and sai knob body having a transverse face intermediate sai tapered recess and said axial recess; and a nut having o one side tool engaging means, fitting said threaded en portion of said sleeve, being substantially wholly confine within said axial recess of said knob body when engagin said end portion of said sleeve, and having on the oth side a face for engaging said face of said knob bod such that an outwardly open annular space remains said axail recess between the knob body and the nut, an said nut by axial movement between sleeve and knob bo radially compressing said split end of said sleeve; wheret the shaft is engaged upon relative axial movement of n and split end portion of the sleeve and the nut is whe tightened protected by the knob body against loosenir and accidental disengagement of shaft and knob.*

References Cited in the file of this patent or the original patent

UNITED STATES PATENTS

| | | |
|---|---|---|
| 1,420,295 | Tait | June 20, 19 |
| 1,563,635 | Kash | Dec. 1, 19 |
| 1,787,105 | Delaney | Dec. 30, 19 |
| 2,151,831 | Buccicone | Mar. 28, 19 |
| 2,256,419 | Tinnerman | Sept. 16, 19 |
| 2,719,047 | Bayes et al. | Sept. 27, 19 |
| 2,801,119 | Paul-Huhne | July 30, 19 |

FOREIGN PATENTS

| | | |
|---|---|---|
| 423,047 | Great Britain | Jan. 24, 19 |
| 586,470 | Great Britain | Mar. 17, 19 |
| 790,205 | Great Britain | Feb. 5, 19 |
| 497,027 | Great Britain | Dec. 12, 19 |
| 890,093 | France | Oct. 25, 19 |